United States Patent [19]
Solomon et al.

[11] Patent Number: 6,003,442
[45] Date of Patent: Dec. 21, 1999

[54] DYNAMIC CLAMPS FOR EXTERNAL DRUM PLATESETTER

[75] Inventors: Yehuda Barnes Solomon, Rishon Lezion; Moshe Beres, Nes Ziona, both of Israel

[73] Assignee: Scitex Corporation Ltd., Herzua, Israel

[21] Appl. No.: 09/069,546

[22] Filed: Apr. 30, 1998

[30] Foreign Application Priority Data

May 30, 1997 [IL] Israel ........................................ 120959

[51] Int. Cl.$^6$ ........................................................ B41F 1/28
[52] U.S. Cl. .................... 101/415.1; 101/409; 271/82; 271/277
[58] Field of Search ............................ 101/415.1, 389.1, 101/409, 477; 271/82, 277

[56] References Cited

U.S. PATENT DOCUMENTS

| | | | |
|---|---|---|---|
| 4,250,810 | 2/1981 | Fowler et al. | 101/410 |
| 4,727,806 | 3/1988 | Green, Sr. | 101/415.1 |
| 5,016,531 | 5/1991 | Schroeder | 101/415.1 |
| 5,052,120 | 10/1991 | Lubberts | 33/618 |
| 5,284,093 | 2/1994 | Guaraldi et al. | 101/415.1 |
| 5,335,046 | 8/1994 | Bosy | 355/73 |
| 5,383,001 | 1/1995 | Bosy | 355/73 |
| 5,516,096 | 5/1996 | Whiteside et al. | 271/277 |
| 5,685,226 | 11/1997 | Fuller | 101/415.1 |
| 5,809,890 | 9/1998 | Knauer et al. | 101/415.1 |

*Primary Examiner*—Edgar Burr
*Assistant Examiner*—Dave A. Ghatt
*Attorney, Agent, or Firm*—Mark M. Friedman

[57] ABSTRACT

A clamp for gripping an edge of a plate that is mounted on the surface of a rotatable drum. The clamp includes a hinge, attached to the drum and including a pivot axis, and a gripper, formed to have a tip, operative to press the edge of the plate against the drum. The gripper is attached to the hinge so that the center of mass of the gripper is in a direction from the pivot axis that is generally opposite the direction of the tip from the pivot axis.

16 Claims, 8 Drawing Sheets

DYNAMIC CLAMPS FOR EXTERNAL DRUM PLATESETTER

FIELD AND BACKGROUND OF THE INVENTION

The present invention relates to clamps for attaching a plate to a rotatable drum and, more particularly, to clamps for attaching plates of various sizes to the drum of a so-called external-drum platesetter that can operate at very high rotation speeds.

Imagesetters, namely marking engines for plotting images on plates or sheets of film, of the so-called external-drum type, are known in the art, Typically, a sheet is attached to the outer surface of a rotating drum and held in contact with the surface by a vacuum system, which has orifices distributed over the surface. Often, such an imagesetter is required to handle sheets of various sizes. U.S. Pat. No. 5,383,001 to Bosy, addresses such a need, by providing a suitable design of the vacuum system.

External-drum platesetters are a particular category of external-drum imagesetters, wherin the image is plotted on a light-sensitive printing plate. Printing plates are generally made of metal and therefore they are stiffer than films and their mass per unit area is much higher. Thus, when a plate is attached to the drum, it requires a greater force to keep it in contact with the drum's surface at any given rotational speed, to counteract the centrifugal force, than is required by a film. Consequently, a vacuum system to hold plates on the rotating drum must be more efficient and more powerful than that used for holding films. However, even with a powerful vacuum system, there is a danger of failure, due to a bend or a bulge at the edge of the plate. Moreover, since in a vacuum system the forces holding the plate are exerted by atmospheric pressure, they have an upper limit. Above a certain rotational speed the centrifugal force per unit area exceeds atmospheric pressure and any plate attachment system solely based on vacuum would then totally fail. Such failures may cause the entire plate to fly off the drum by centrifugal action—which would be disastrous for the entire machine. Therefore platesetters require mechanical attachment means—either to assist the vacuum system and guard against drastic failure, or as the main holding means, possibly still aided by vacuum. One common and useful such means is clamps mounted on the drum and operative to hold down the edges of the plate.

Clamps and grippers for holding a plate onto a rotatable drum have been known in the art. For example, clamps (also called grippers) are generally used in offset printing presses to hold the printing plate onto a cylinder. During operation, centrifugal forces act to cause a pulling force on each edge of the plate, such that tends to pull the edge from the clamp. Therefore in printing presses, clamps are designed to exert enough gripping force to exceed that required for countering the centrifugally induced pulling force, at maximum expected rotational speed, by a safety margin. Such clamps are disadvantageously cumbersome for mounting on platesetters and, moreover, difficult to activate (i.e. to open for accommodating the plate), because they must include either a heavy bolting or leveraging mechanism or a very strong spring-loading mechanism. A clamp on a printing cylinder must also exert a positive stretching force on the plate, in order to assure contact between the plate and the cylinder over its entire surface.

U.S. Pat. No. 3,203,074 describes an improved clamp, in which the gripping and stretching forces increase by centrifugal action in proportion to the rotational speed. A clamp with such a centrifugal action (also termed dynamic clamp) may overcome the disadvantages discussed in the previous paragraph. U.S. Pat. No. 4,250,810 discloses a further improved clamp with centrifugal action whereby the gripping and stretching forces can be independently adjusted.

It is noted that in platesetters, there usually is also a vacuum system, which assures contact between the plate and the drum over its entire surface, and that therefore no stretching force, but only a gripping, force, is required at the edges of an attached plate. U.S. Pat. No. 5,335,046 discloses a clamp for the drum of a platesetter with a mechanism that centrifugally induces a gripping force. There is a row of such clamps for the leading edge and another one for the trailing edge. The mechanism includes a weight, connected to the clamp by a rod, located inside the drum near the opposite surface. The clamp is opened by means of a piston and cylinder assembly, activated by supplied pressurized air. The clamp mechanism of the '046 patent has two serious drawbacks: (1) It is relatively complicated, with a relatively large number of parts, and thus is expensive to manufacture. (2) It does not conveniently accommodate plates of various sizes. The '046 patent does disclose the possibility of providing a row of trailing edge clamps for each plate size; however, such an arrangement is even more expensive and, furthermore, does not accommodate small variations in plate size. The secondly listed drawback also applies to other types of clamps of prior art, such as those discussed hereabove.

There is thus a widely recognized need for, and it would be highly advantageous to have, a clamping system, for attaching a plate to a rotatable drum, that is dynamic, i.e. has a centrifugally induced gripping action, is adaptable to any plate size and easy to operate and is of simple design, having a small number of parts.

SUMMARY OF THE INVENTION

The present invention successfully addresses the shortcomings of the presently known configurations by providing a an inexpensive dynamic clamping system, for attaching a plate of variable size to a rotatable drum, such as that of a platesetter, so that the plate is firmly gripped at any rotational speed.

The present invention discloses a novel design of a clamp, such that the gripping force exerted by it on the edge of the plate increases with the rotation speed of the drum by centrifugal action. The design of the clamp, moreover, allows placing it at any position around the drum, to accommodate any length of plate, and to be anchored at that position with a force that, likewise, increases by centrifugal action.

More specifically, the clamp of the present invention comprises a gripper that is attached to the drum by means of a hinge. The largest part of the gripper consists of a body that extends substantially to one side of the pivot axis of the hinge. The portion of the gripper that extends to the other side of the pivot axis is relatively short and at its end is a tip, operative to press an edge of the plate onto the underlying surface of the drum. A spring is operative to provide a static force for the tip's pressure on the plate. During drum rotation, centrifugal force virtually acting on the large body of the gripper, in a radially outward direction, is translated by the pivoting effect into a radially inward force on the tip, thus increasing its pressure on the plate.

In a slidable configuration, the clamp also comprises a base, attached to the other member of the hinge (the first member being attached to, or part of, the gripper). The drum is provided with a plurality of undercut grooves, preferably, in a circumferential orientation, each groove being wider at its bottom, inside the wall of the drum, than near the drum's surface. The base of the clamp is shaped to fit the wide portion of the groove and to slide therealong. The gripping force of the clamp also acts to push the base against the upper surface of the groove's wide portion, causing friction therebetween, thus keeping the clamp from sliding along the groove. The force of this friction also increases with the drum's rotation speed, owing to the increased gripping force and owing to centrifugal action on the base itself.

To mount a plate on the drum, the stationary clamps are first opened, by pushing on their bodies radially inward, then inserting one end of the plate and releasing the clamps to grip it, after wrapping the plate around the drum, its other end is gripped by slidable clamps, by first pushing on their gripper bodies (which releases the friction with the groove), then moving them to the other end of the plate and finally releasing them—to grip that end and to become anchored there. This process can be mechanized, using slow drum rotation in both directions.

According, to the present invention there is provided a clamp for gripping an edge of a plate that is mounted on the surface of a rotatable drum, the clamp comprising a hinge, attached to the drum and having a pivot axis, and a gripper, formed to have a tip, operative to press the edge of the plate against the drum, the gripper being attached to the hinge so that the center of mass of the gripper is in a direction from the pivot axis that is generally opposite the direction of the tip from the pivot axis and the gripper is furthermore formed to have a sufficient moment of mass with respect to the pivot axis, wherein the pressure of the tip against the drum is partly derived from centrifugal effect.

According to an alternative configuration, the clamp's hinge is slidably attached to the drum.

According to further features in preferred embodiments of the invention described below, the hinge is attached to a base, which is slidable within, and along, a groove cut into the drum's surface and sliding of the base with respect to the drum is hindered by friction partly derived from centrifugal effect.

In another aspect of the present invention, there is provided a gripping system for gripping edges of a plate that is mounted on the surface of a rotatable drum, comprising a plurality of clamps, each operative to grip an edge of the plate and including a hinge, having a pivot axis and attachable to the drum, and a gripper, formed to have a tip that is operative to press an edge of the plate against the drum, the gripper being attached to the hinge so that the center of mass of the gripper is in a direction from the pivot axis that is generally opposite the direction of the tip from the pivot axis and the gripper is furthermore formed to have a sufficient moment of mass with respect to the pivot axis, wherein the pressure of the tip against the drum is partly derived from centrifugal effect and wherein the hinges of at least some of the clamps are slidably attached to the drum, by means of bases, which are slidable along grooves cut into the drum's surface.

According to still other features of the present invention, stationary clamps preferably grip the leading edge of the plate, the slidable clamps preferably grip the trailing edge, other slidable clamps optionally grip a side edge of the plate and the plate, as mounted, may have any circumferential dimension and any axial dimension, up to certain maxima.

In yet another aspect of the present invention, there is provided a plate marking apparatus comprising a rotatable drum, having an outer cylindrical surface for mounting a plate thereon, and a plurality of clamps, each operative to grip an edge of the plate and including a hinge, having a pivot axis, and a gripper, formed to have a tip that is operative to press an edge of the plate against the drum, the gripper being attached to the hinge so that the center of mass of the gripper is in a direction from the pivot axis that is generally opposite the direction of the tip from the pivot axis.

There is also provided herein a method for mounting a plate on the surface of a rotatable drum, comprising the steps of (a) providing a plurality of clamps, each operative to grip an edge of the plate, the clamps being configured in two groups, a first group being fixedly attached to the drum and aligned along a line essentially parallel to the axis of the drum and a second group being slidably attached to the drum;

(b) providing a mechanism reversibly operative on any of the clamps in the second group to engage it, to prevent it from gripping and to cause it to become slidable with respect to the surface of the drum;

(c) causing all of the clamps in the second group to stay clear of an area of the surface of the drum, such that will allow attachment of the plate thereto;

(d) causing suitable ones of the clamps in the first group to grip a first edge of the plate;

(e) temporarily attaching the plate to the drum's surface;

(f) operating the mechanism so that desired ones of the clamps in the second group become engaged and slidable and are prevented from gripping;

(g) rotating the drum while the desired ones of the clamps continue to be engaged by the mechanism and slide circumferentially with respect to the drum; and (h) operating the mechanism so that the desired ones of the clamps become disengaged and grip a second edge of the plate.

According to a refinement of the method, any of the clamps in the second group is operative to grip an edge of the plate by means of pressure that is partly derived from action of a spring and partly—from centrifugal effect.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an inexpensive dynamic clamping system, for attaching a plate to a rotatable drum.

Specifically, the present invention can be used to easily attach a plate of any size to the drum of a marking engine, such as a platesetter, so that the plate is firmly gripped at any rotational speed. The clamping system is characterized by simple design and a small number of parts.

The principles and operation of a clamping system according to the present invention may be better understood with reference to the drawings and the accompanying description.

Figure 1:
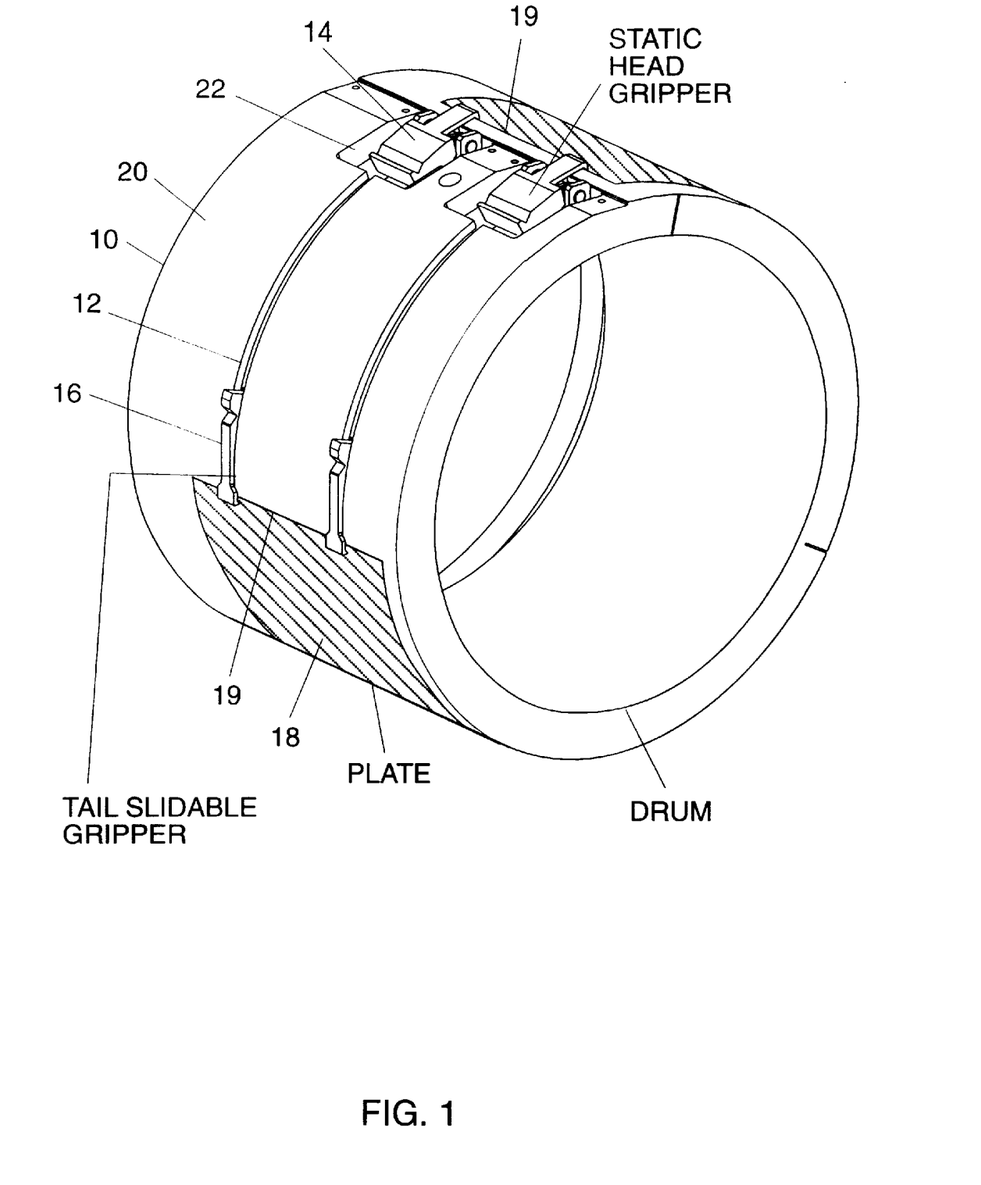
FIG. 1 is an isometric drawing, schematically showing a drum with the clamping system of the present invention.
Figure 2:
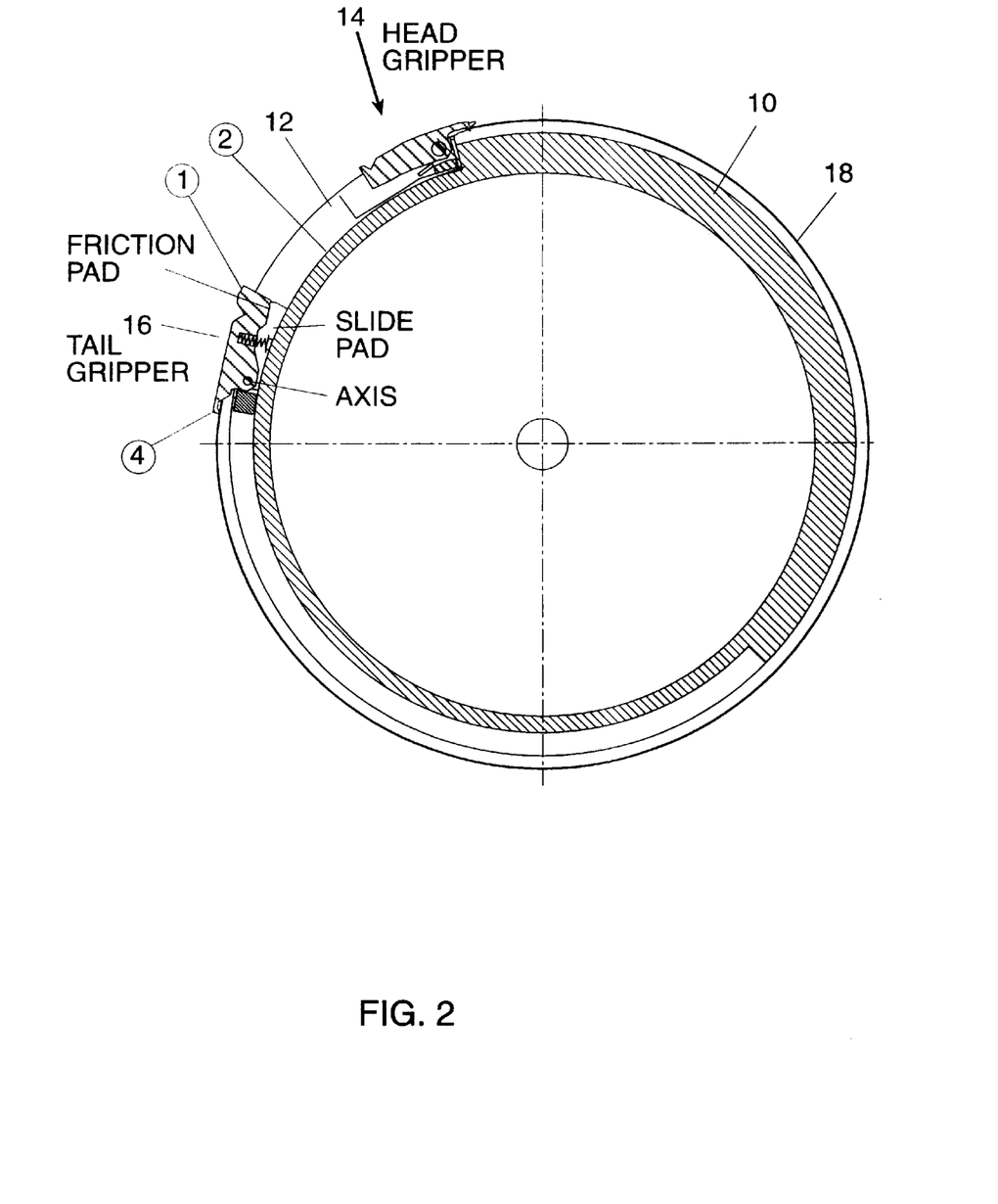
FIG. 2 is a cross-sectional view of the system of FIG. 1.

Referring now to the drawings, FIG. 1 is an isometric view, and FIG. 2—a cross-sectional view, of a drum with a preferred embodiment of the clamping system of the present invention. There is shown a drum 10, with outer surface 20. Surface 20 is cut by two (generally—several) grooves 12 running circumferentially and extending over a considerable portion of the drum's circumference. Each groove 12 has an undercut profile, to be described herebelow. At one end of each groove 12 is a stationary clamp 14, fixedly attached to drum 10. Stationary clamp 14 is attached preferably within a depression 22, cut into surface 20, in order to keep the extent of the clamp above surface 20 to a minimum, so as to clear an optical assembly (not shown) suspended a small distance above the surface. In each groove 12 there is a slidable clamp 16, to be described herebelow. Stationary clamp 14 and slidable clamp 16 are operative to grip a plate 18 near its end edges 19. Drum 10 is preferably provided with a vacuum system, operative to press the entire surface of plate 18 onto surface 20.

Figure 5:
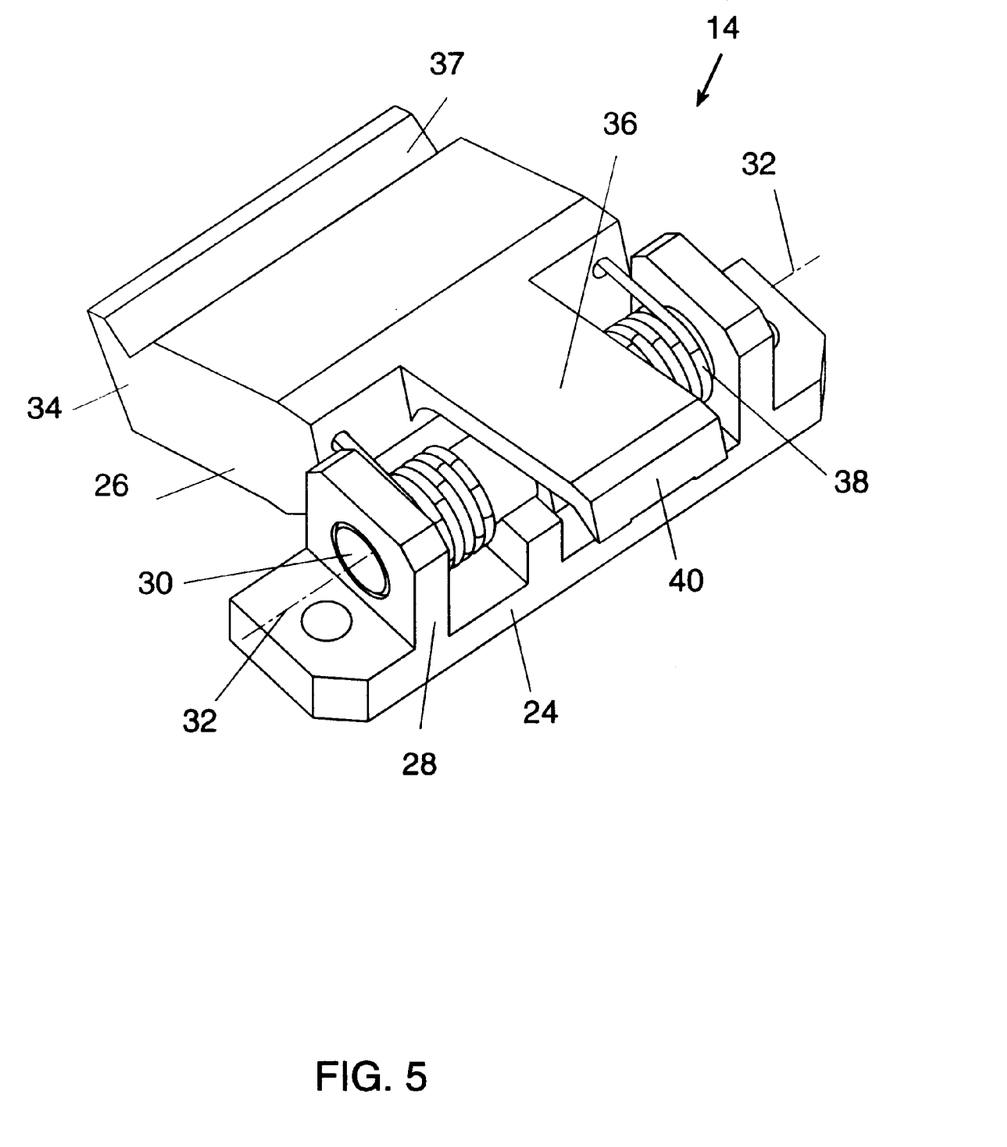
FIG. 5 is an isometric view of a stationary clamp according to the present invention.

Referring now to FIG. 5, there is shown the construction of stationary clamp 14. It consists essentially of two parts—a base 24 and a gripper 26—mutually attached by a hinge 28, which, for example includes a cylindrical pin 30, whose axis forms the pivot axis 32 of the hinge. Gripper 26 is formed so as to have a relatively large body 34, extending to one side of pivot axis 32, and a relatively short tongue 36, extending to the other side of pivot axis 32. Body 34, preferably has a flat top surface, with a notch 37 cut across it. Tongue 36 has a tip 40. It is noted that base 24 serves to join hinge 28 to the drum and could also be regarded as part of the hinge structure; other structures and other means for such joining may be provided. The assembly of stationary clamp 14 also includes a spring, such as coiled spring 38, disposed around hinge pin 30.

Stationary clamp 14 is attached to drum 10 by fastening base 24 to the drum, for example—by means of screws, preferably inside a depression 22 (FIG. 1), so that tongue 36 preferably points in a direction opposite the normal direction of drum rotation and so that tip 40 lies beyond the depression (that is, in contact with surface 20). Spring 38 acts to lift body 34 away from the drum and thus press tongue 36 toward the drum. The tip 40 of tongue 36 preferably has a friction pad or one or more small protrusions thereon, facing the drum. Normally, tip 40 is pressed against drum surface 20. Spring 38 acts to make this pressure strong enough to grip the edge of a plate, which has been inserted between the tip and the drum surface, under static conditions. All stationary clamps 14 are attached to drum 10 so that they are aligned along a line that, preferably, is parallel to the drum's axis.

When drum 10 rotates, centrifugal force on body 34 tends to lift it away from the drum. This force is translated by the pivoting action into a radially inward force of tip 40, which thus increases its pressure against drum surface 20 and consequently also the gripping force on the edge of a plate therebetween. The centrifugal force is essentially $$CF = M \times (!)^2 \times R$$

where M is the mass of gripper 26, (!) is the angular speed of the drum and R is the distance from the drum's axis of rotation (not shown) to the center of mass 42 of gripper 26. The force at tip 40 is essentially $$TF = CF \times D1/D2$$

where D1 is the distance from pivot axis 32 to center of mass 42 and D2 is the distance from pivot axis 32 to the middle of tip 40. Clearly, it is desirable, at any rotational speed, to make TF large enough to grip the edge of the plate firmly enough to prevent its being pulled out. This can be achieved, for any given design of tongue 36 and tip 40 (which also fixes D2), by making the moment of centrifugal force, CF×D1, to be of sufficient magnitude. This, in turn, is obtained, for a given drum radius R and any angular speed (!), by making the moment of mass of gripper 26 with respect to pivot axis 32, M×D1, to have sufficient magnitude. The moment of mass may be made sufficiently large by appropriate construction of body 34; for example, M may be made large enough by making the body's volume large and or fabricating it out of a high-density substance, while a sufficient complementary value for D1 may be obtained by shaping the body so as to extend sufficiently far from hinge 28.

Figure 4A:
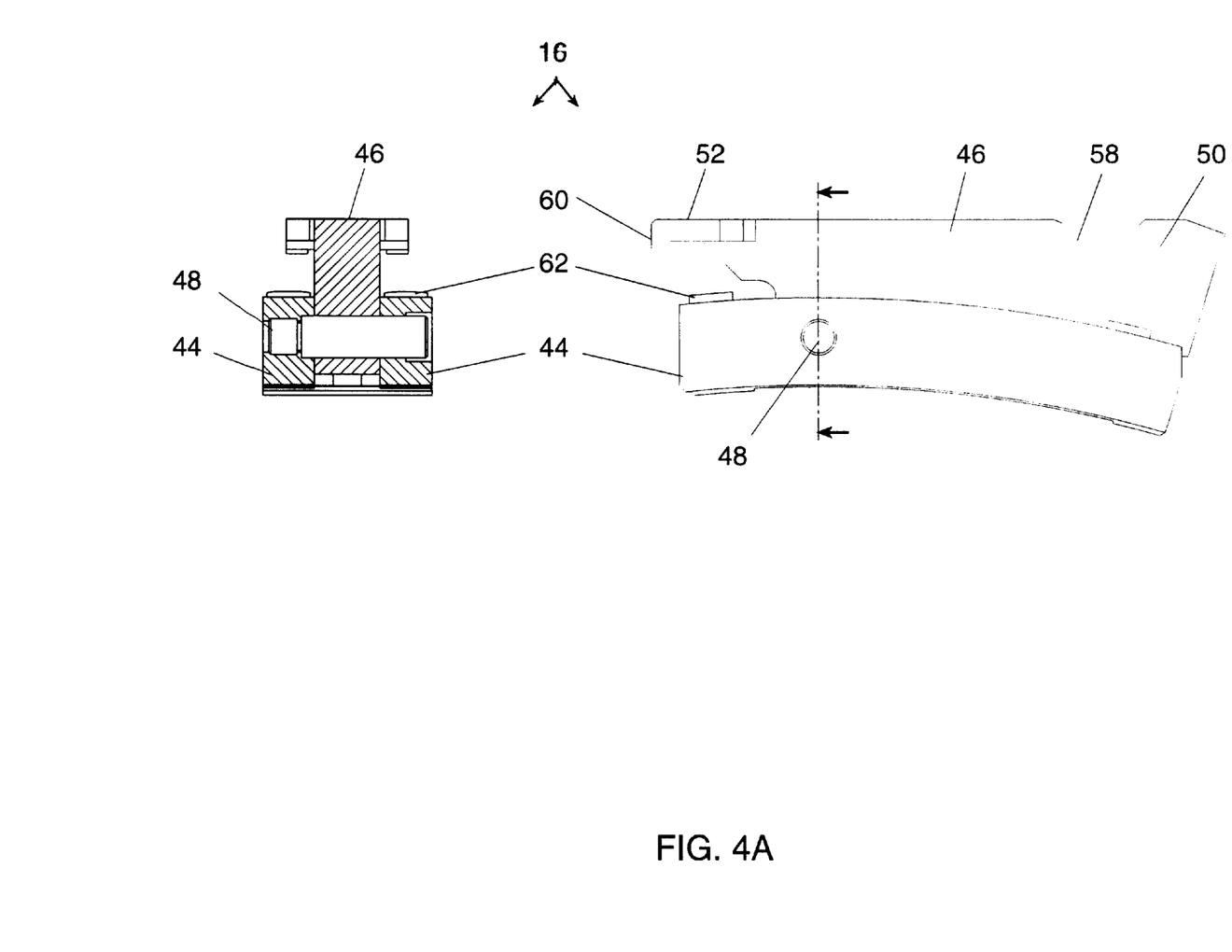
FIG. 4A is a side view and cross-sectional view of a slidable clamp according to the present invention.
Figure 4B:
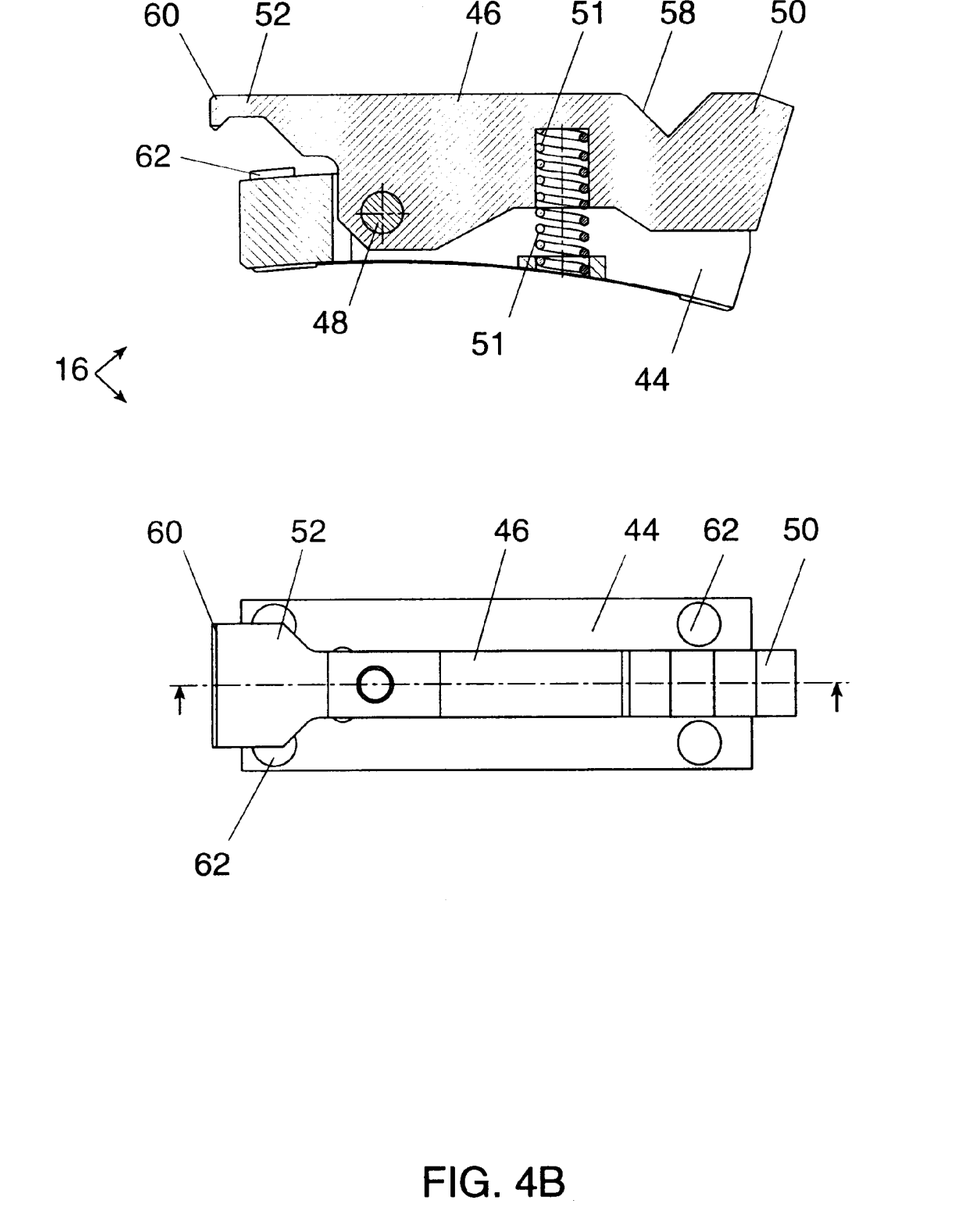
FIG. 4B is a top view and sectional side view of the slidable clamp of FIG. 4A.

We now refer to FIG. 4A, which shows slidable clamp 16 in a side view and in a cross-sectional view and FIG. 4B, which shows the same in a length-sectional view and a top view. Slidable clamp 16 is, in principle, similar to stationary clamp 14—both in its construction and in its mode of action, except for some essential details, to be described herebelow. It consists of base 44 and a gripper 46, joined by a hinge, which includes, for example, pivot pin 48. Gripper 46 is formed to have, on one side of pivot pin 48, an elongated massive body 50 and, on the other side of that pin, a short tongue 52, which ends with a tip 60. A spring 51, preferably of the compression type, is disposed between base 44 and body 50. When clamp 16 is mounted on drum 10 (as will be described herebelow), spring 51 acts to push body 50 radially outwards and, by the pivoting action, to press tip 60 radially inwards. When the edge of a plate lies under tip 60, the latter then presses against it. When the drum rotates, the centrifugal force virtually acting on body 50 is added to the push of spring 51 and thus the pressure of tip 60 on the plate underneath it is increased—all in a manner similar to that described hereabove with respect to stationary clamp 14. Clearly, again, it is desirable to make the mass of body 50 of gripper 46 as large as possible. This can be done by making it of dense material and/or by making any of its dimensions as large as possible. In the preferred embodiment described herein, body 50 is shaped to be narrow and relatively tall (i.e. with large dimension in the radial direction), but also other shapes are possible. According to this embodiment, base 44 has a central slot stunk into its upper surface over most of its length, the width of the slot being slightly greater than the width of body 50. Thus base 44 can partially accommodate body 50 during the latter's motion about pivot 48.

Figure 3:
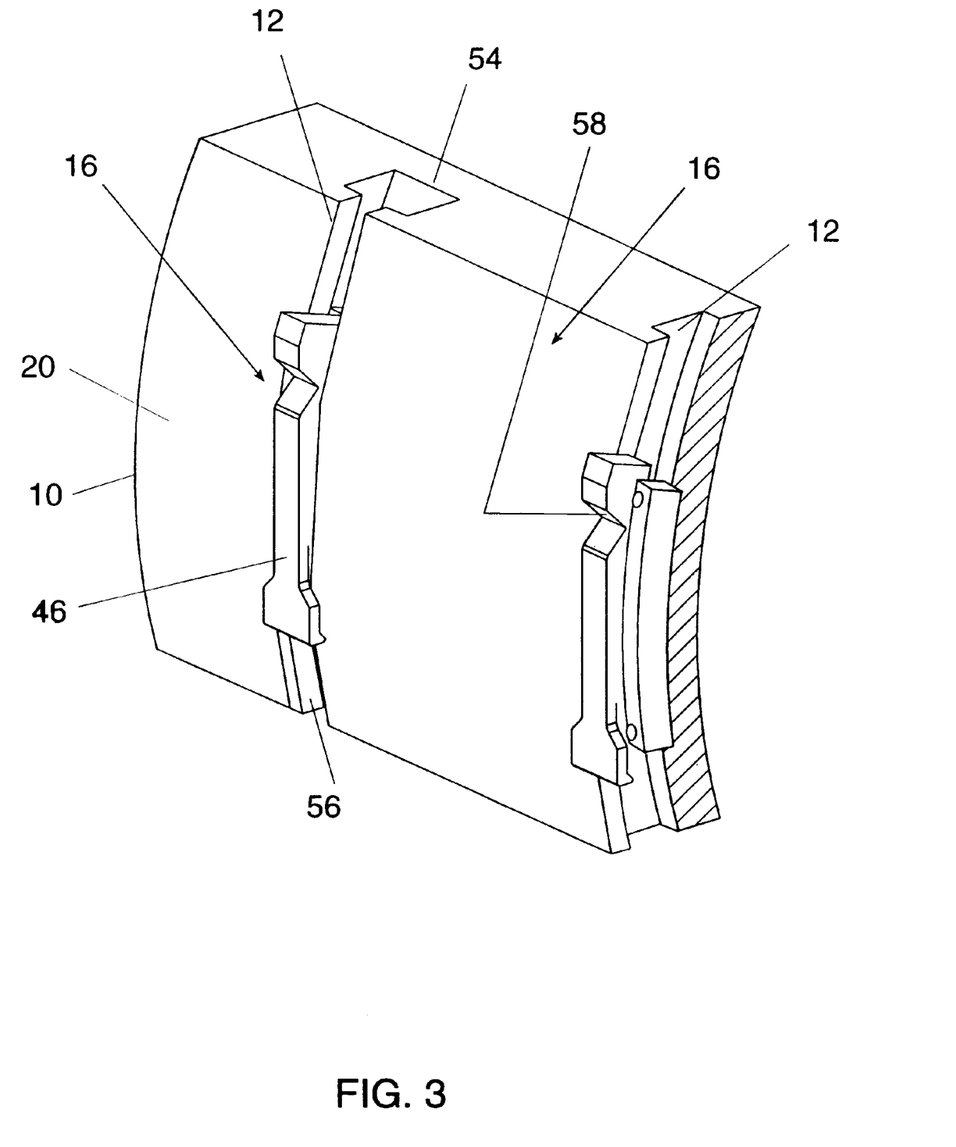
FIG. 3 is an isometric drawing, schematically showing a portion of the drum of FIG. 1 with slidable clamps according to the present invention.

Referring now to FIG. 3, which shows a section of drum 10 with corresponding segments of two grooves 12 (one of them shown cut open) and a slidable clamp 16 mounted inside each groove, it is noticed that each groove 12 is undercut into the wall of drum 10; that is, the groove is relatively narrow near surface 20 of the drum and wider under the surface, inside the wall. Preferably, the profile shape of the wide portion 54 of groove 12 is rectangular. Base 44 of slidable clamp 16 is formed to conform to wide portion 54 and to easily slide therealong. Body 50 of gripper 46 is formed to be slightly narrower than the narrow portion 56 of groove 12, so that it is slidable through that narrow portion whenever base 44 slides through wide portion 54. Preferably, body 50 of gripper 46 is also formed, and clamp 16 assembled, so that in its normal position, body 50 protrudes from groove 12 beyond surface 20. The top surface of body 50 preferably has a depression, such as notch 58, cut into it (to be engaged by an activation pin, as described herebelow).

Slidable clamps 16 are mounted each in a groove 12 so that tip 60 of tongue 52 of gripper 46 preferably points in the direction of normal drum rotation. As will be described herebelow, during normal operation, the (preferably) trailing edge of plate 18, mounted on drum 10, lies underneath tip 60 and is pressed by the latter. Tip 60 is preferably substantially wider than narrow portion 56, thus bridging the latter and pressing the plate directly against drum surface 20. It is also preferably provided, on its side facing plate 18, with one or more small protrusions or with a friction pad. These are operative, under the aforementioned pressure by the tip on the plate against surface 20, to firmly grip the edge of the plate.

The bottom surface of base 44 is preferably coated with a glide pad, which operates to ease its sliding on the bottom surface of wide portion 54 of groove 12 whenever pushed against it. The top surface of base 44 has preferably attached thereto one or more friction pads 62 (FIGS. 4), positioned so as to be able to contact the top surface of wide portion 54 of groove 12. The gripping force of tip 60 on the plate (due to the action of spring 51 and due to centrifugal force on body 50) is countered by an upward pressure of the portion of base 44 that lies underneath (opposite) tongue 52. The base is thus pressed against the top surface of wide portion 54, preferably through friction pads 62, thereby inhibiting any sliding motion therebetween. During drum rotation, additional upward pressure is exerted by the entire base 44, due to centrifugal forces on itself—which adds to its friction with the top surface of wide portion 54.

Looking at the action of slidable clamps 16 from a different point of view, the clamps may be regarded as forcefully clamping together the plate (at its edge) and the outer shell of the drum (being between the top surface of wide portion 54 and drum surface 20)—simultaneously anchoring the plate and base 44 to the drum. The clamping force is increased by centrifugal action on body 50. In the case of stationary clamps 14, the clamping action is on the plate alone—between tip 40 and drum surface 20.

It is noted that the construction of the clamps of the present invention, of both types, is inherently simple and involves a very minimal number of components. Such clamps are therefore advantageously inexpensive to fabricate.

Figure 6:
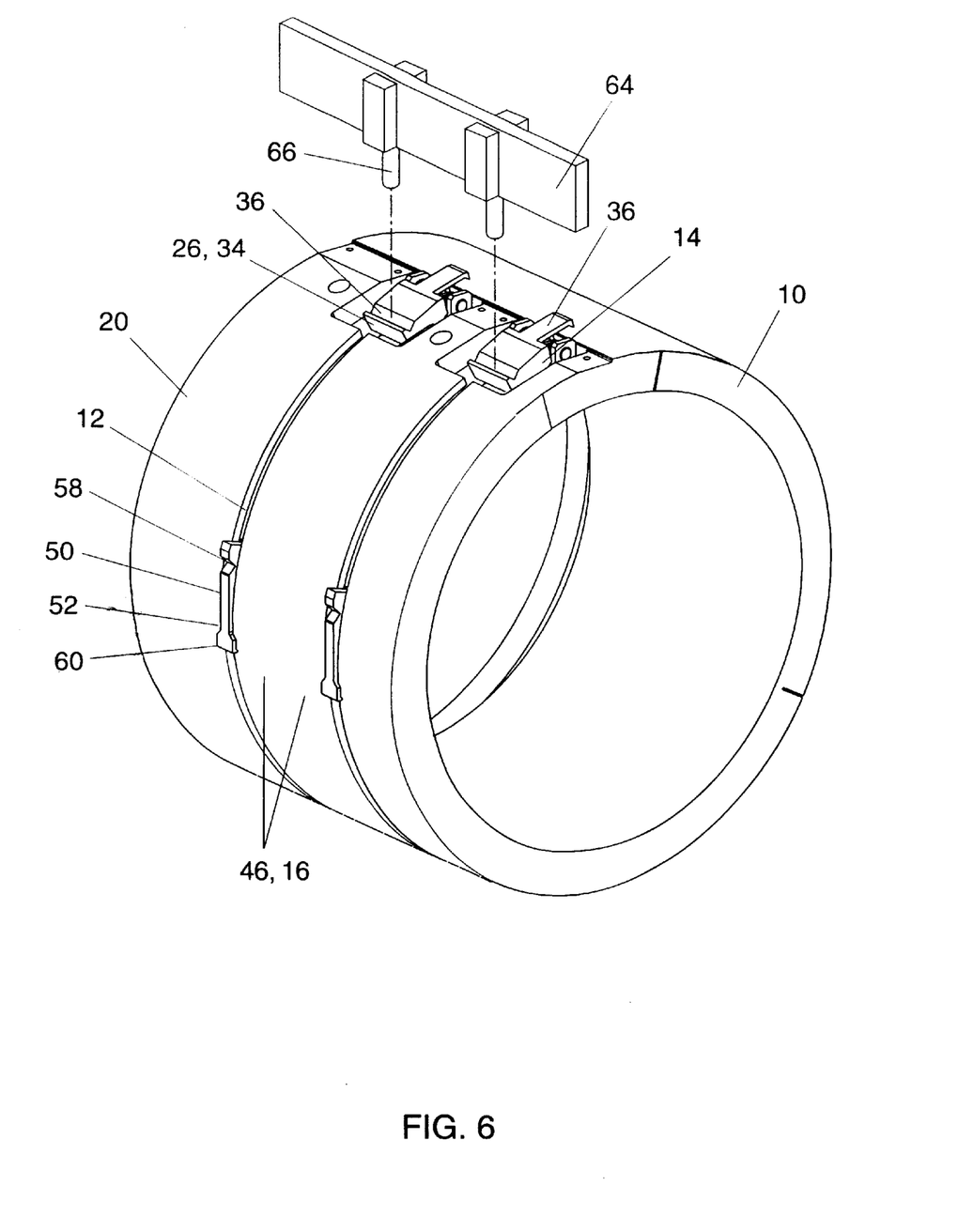
FIG. 6 is a schematic isometric drawing of a platesetter illustrating operation of the clamping system of the present invention.

Typical operation of the clamps will now be explained with reference to FIG. 6. There is shown by way of example, an activation mechanism, in relation to the drum and the clamps thereon. It includes a bar 64, subtending the length of drum 10 and suspended, parallel to its axis, at a certain distance from surface 20. In bar 64 are pins 66, one pin essentially coplanar with each groove 12, which are movable radially. The pins may be moved by any of a variety of means, such as solenoids, pneumatic actuators or a cam. In an alternative configuration, bar and pins may be replaced by a direct activation mechanism, such as a cam or a manually operable lever assembly. Mounting of a plate, to be subsequently plotted, onto drum 10 proceeds as follows:

1. Initially all slidable clamps are preferably aligned along a common line, parallel to the drum's axis and circumferentially just far enough from the stationary clamps to freely accommodate the full length of the plate; the latter condition can be arrived at by moving all slidable clamps in a manner similar to that described in steps 7 and 8 herebelow, whereas initial alignment along a line can easily be performed manually 2. The drum is rotated to a position (shown in the illustration) such that notch 36 on body 34 of each stationary clamp 14 is directly under a corresponding one of pins 66.

3. Pins 66 are pushed inwards, pressing on bodies 34 against the force of spring 38 (FIG. 5) and causing tips 40 to lift off surface 20.

4. A new plate (not shown) is introduced tangentially to the drum (from top right, in the illustration) and registered thereon (preferably by means of registration pins provided thereon) so that preferably its leading edge is positioned under tongues 36 of all relevant clamps 14, a certain distance behind corresponding tips 40.

5. Pins 66 are withdrawn, freeing all grippers 26 to grip the edge of the plate, in a manner explained hereabove.

6. The drum is slowly rotated (counter-clockwise in the illustration) while the plate is being gradually attached to its surface, for example by means of rollers (not shown): if a vacuum system is included, it becomes operational at this step.

7. Rotation stops when notches 58 on bodies 50 of slidable clamps 16 are positioned directly below pins 66; the pins are then pushed inwards, pressing on bodies 50 against the forces of springs 51 (FIGS. 4) and causing tips 60 to lift off surface 20; they also cause bases 44 to be pushed against the bottom surfaces of grooves 12

8. The drum is slowly rotated backwards (clockwise in the illustration) while clamps 16, which are held stationary by pins 66 engaging notches 58, slide along their respective grooves 12.

9. The backward rotation stops when the other (preferably trailing) edge of the plate becomes positioned under tongues 52 of the relevant clamps, a certain distance behind corresponding tips 60.

10. Pins 66 are withdrawn, freeing all grippers 46 to grip the trailing edge of the plate, in a manner explained hereabove.

11. The drum is accelerated to normal operational speed and plotting proceeds in the usual manner.

Demounting of the plate, after plotting, proceeds in a similar manner, though essentially in a reverse order. For this operation another bar, similar to activation bar 64 with pins 66, may be used.

It is noted that during normal (fast) drum rotation, the clamps firmly grip the plate, through the pressure of the tips of the tongues against the drum surface, and simultaneously each slidable clamp is, in effect, anchored in its position, through friction (preferably by means of the friction pads) between the top surface of its base and the top surface of the wide portion of the groove—all assisted by centrifugal effects, as explaned hereabove.

It is also noted that the position of each slidable clamp along its respective groove is infinitely variable, within a range determined by the circumferential length of a groove, and that therefore the length of a plate that can be gripped by it may assume an infinite number of values within a corresponding range. It is likewise noted that operating the clamps (both in gripping a plate and in positioning a slidable clamp) is relatively easy, whether done manually or by an activation mechanism such as described hereabove. It is further noted that even if only a single length of plates need ever be accommodated, the configuration with slidable clamps advantageously eases the process of gripping plates during mounting and releasing them during demounting (all—by the use of reverse rotation).

Furthermore it is noted that nothing has to be fed to the clamps in order for them to operate as described (that is—they do not require vacuum, or pressurized air or electric current, etc.). Such feeding on a rotating drum would require special provisions, which are relatively expensive; dispensing with them, as permitted by the present invention, is therefore advantageous.

It will be appreciated that other means and procedures, including manual ones, for mounting a plate on the drum, or demounting it therefrom, and for operating the clamps and moving the slidable clamps along the grooves, are possible—all coming within the scope of the present invention. It will also be appreciated that a drum may be provided with any number of stationary clamps and any number of grooves, each groove with a corresponding slidable clamp, but not all clamps need be engaged; in particular, if a plate substantially narrower than the length of the drum is mounted, only a corresponding number of the clamps would be engaged in gripping it. Although, in the preferred embodiment, each stationary clamp is paired, and axially aligned, with a groove and a corresponding slidable clamp, it will be appreciated that such pairing and/or alignment is not essential and that the number of stationary clamps need not be equal to the number of slidable clamps. In such a case, the activating mechanism of FIG. 6 may include additional pins—for any stationary clamps that are not aligned with corresponding grooves. It will further be appreciated that slidable clamps can also be utilized in place of stationary clamps.

Figure 7:
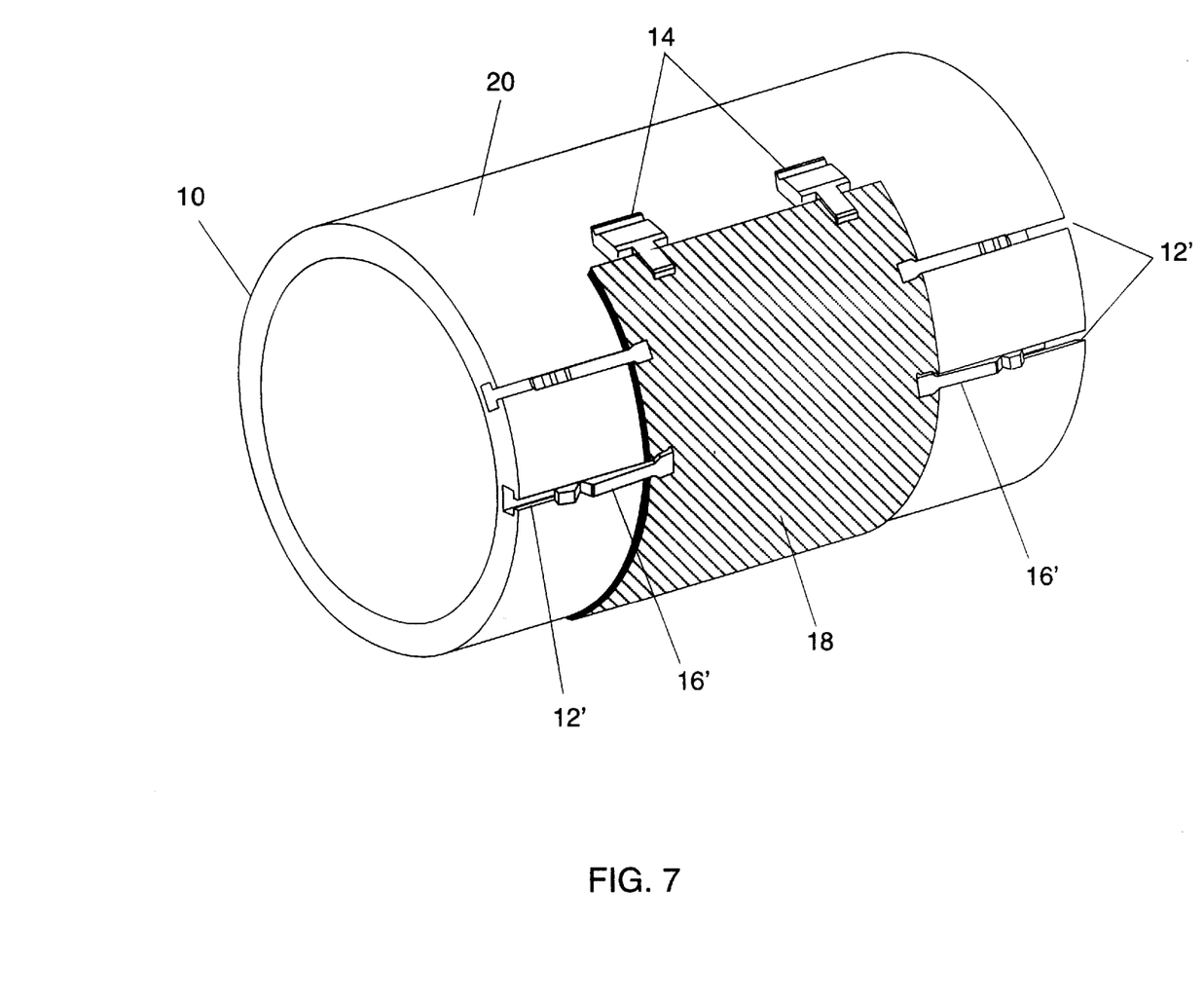
FIG. 7 is an isometric drawing, schematically showing an alternative configuration of the clamping system of the present invention.

In an alternative configuration, basically similar to that described hereabove, there may be additional clamps, preferably of the slidable type, disposed on the drum so that they can operate to grip a plate 18 along its side edges. A preferred embodiment of such a configuration is illustrated in FIG. 7. Here a number of grooves 12', similar to grooves 12, are cut into surface 20 of drum 10 in a generally axial direction. Pairs of slidable clamps 16', similar to 16, are mounted one to a groove 12' and facing its middle. A plate 18 is mounted on the drum and held, at one end, by stationary clamps 14 and, at the other end, by slidable clams (not shown). Slidable clamps 16' are then operated, in a manner similar to that described hereabove, to grip the side edges of a mounted plate and thus offer additional safety and holding power; they may be particularly advantageous in holding down a plate on a drum that lacks a vacuum system. It is noted that plates of any width (up to nearly the length of the drum) may thus be gripped.

What is claimed is:

1. An apparatus for clamping a flexible sheet medium onto a rotatable support surface with forces that increase as the rotational speed of the support surface increases, said apparatus comprising:

a rotatable support member, having a cylindrical support surface, for supporting the flexible sheet medium thereon;

at least one clamp, attached to said support member and operative to clamp an edge of the sheet medium onto said support surface with a clamping force that is partly derived from a centrifugal effect during rotation of said support member; and release means operative to directly engage any of said at least one clamp, while stationary, so as to counter its clamping action;

said clamp including:
   a hinge, attached to said support member and having a pivot axis that is generally parallel to a nearest section of said support surface;
   a gripper, attached to said hinge so as to be pivotable about said pivot axis; and
   a spring attached to said hinge and to said gripper;
   said gripper being formed to have a tip and a body section, said body section having a center of mass and an outer surface which are disposed in a direction from said pivot axis that is generally opposite the direction of said tip from said pivot axis;
   said tip being operable to engage said edge of the sheet medium for clamping it onto said support surface;
   said spring being operative to impart a pivoting momemt to said gripper such as to cause said tip to press on said edge of the sheet medium against said support surface; and
   said outer surface being pushably engagable by said release means.

2. A plate marking apparatus comprising:

a rotatable drum, having a cylindrical support surface for mounting one or more plates thereon; and a plurality of clamps, each operative to clamp an edge of a plate, at least two clamps being slidable clamps, each slidable clamp being slidably attached to said drum and operative to clamp an edge of a plate onto said support surface with a clamping force that is partly derived from a centrifugal effect during rotation of said drum and including:
   a base, slidably attached to said drum and including a hinge with a pivot axis that is generally parallel to a nearest section of said support surface;
   a gripper, attached to said hinge so as to be pivotable about said pivot axis; and
   a spring attached to said base and to said gripper;
   said gripper being formed to have a tip and a body section, said body section having a center of mass and an outer surface which are disposed in a direction from said pivot axis that is generally opposite the direction of said tip from said pivot axis;
   said tip being operable to engage said edge of a plate for clamping it onto said support surface; and
   said spring being operative to impart a pivoting momemt to said gripper such as to cause said tip to press on said edge of a plate against said support surface.

3. The apparatus of claim 2, wherein, for each slidable clamp, said base and said drum have a first and second contact surface, respectively, both surfaces slidably engaging each other with non-zero friction therebetween and being so oriented that, when the drum rotates, the second contact surface exerts a centripetal force on the first contact surface, to increase the friction therebetween.

4. The apparatus of claim 3, wherein said drum has at least two grooves cut into it and, for each clamp, said base further includes a plate, which is slidable within, and along, a corresponding one of said grooves, said first contact surface forming a portion of the surface of said plate and said second contact surface forming a portion of the surface of said corresponding groove.

5. The apparatus of claim 4, wherein said grooves are circumferentially oriented with respect to said drum.

6. The apparatus of claim 5, wherein the length of each of said grooves is greater than half the cirumference of said drum.

7. The apparatus of claim 4, wherein said grooves are axially oriented with respect to said drum.

8. The apparatus of claim 2, further comprising release means operative to directly engage and push the outer surface of the gripper of any of said slidable clamps, while stationary, so as to counter its clamping action.

9. The apparatus of claim 8, wherein said release means and the outer surface of the gripper of any slidable clamp are formed to interlock while mutually engaged, so that, while the release means pushes the outer surface, said drum is free to rotate while the respective slidable clamp remains stationary.

10. An apparatus for clamping a flexible sheet medium onto a rotatable support surface with forces that increase as the rotational speed of the support surface increases, said apparatus comprising:

a rotatable support member, having a cylindrical support surface, for supporting a flexible sheet medium thereon;

at least one clamp, slidably attached to said support member and operative to clamp an edge of the sheet medium onto said support surface with a clamping force that is partly derived from a centrifugal effect during rotation of said support member;

each clamp including:

a base, slidably attached to said support member and including a hinge with a pivot axis that is generally parallel to a nearest section of said support surface;

a gripper, attached to said hinge so as to be pivotable about said pivot axis; and a spring attached to said base and to said gripper;

said gripper being formed to have a tip and a body section, said body section having a center of mass and an outer surface which are disposed in a direction from said pivot axis that is generally opposite the direction of said tip from said pivot axis;

said tip being operable to engage said edge of the sheet medium for clamping it onto said support surface; and said spring being operative to impart a pivoting momemt to said gripper such as to cause said tip to press on said edge of the sheet medium against said support surface.

11. The apparatus of claim 10, wherein, for each clamp, said base and said rotating member have a first and second contact surface, respectively, both surfaces slidably engaging each other with non-zero friction therebetween and being so oriented that, when the rotating member rotates, the second contact surface exerts a centripetal force on the first contact surface, to increase the friction therebetween.

12. The apparatus of claim 11, wherein said rotating member has at least one groove cut into it, underneath said support surface, each groove having inner walls, a portion of which forms at least part of said second contact surface.

13. The apparatus of claim 10, further comprising release means operative to directly engage and push the outer surface of the gripper of any of said at least one clamp, while stationary, so as to counter its clamping action.

14. The apparatus of claim 13, wherein said release means and the outer surface of the gripper of any clamp are formed to interlock while mutually engaged, so that, while the release means pushes the outer surface, said rotating member is free to rotate while the respective clamp remains stationary.

15. A method for mounting a plate on the surface of a rotatable drum, comprising the steps of (a) providing a plurality of clamps, each operative to grip an edge of the plate, said clamps being configured in two groups, a first group being fixedly attached to the drum and aligned along a line essentially parallel to the axis of the drum and a second group being slidably attached to the drum, each clamp being slidable along a circumferential path;

(b) providing a mechanism reversibly operative on any of said clamps in said second group to engage it, to prevent it from gripping and to cause it to become slidable with respect to the surface of the drum;

(c) causing all of said clamps in said second group to stay clear of an area of the surface of the drum, such that will allow attachment of the plate thereto;

(d) causing suitable ones of said clamps in said first group to grip a first edge of the plate;

(e) temporarily attaching the plate to the drum's surface;

(f) operating said mechanism so that desired ones of said clamps in said second group become engaged and slidable and are presented from gripping;

(g) rotating the drum while said desired ones of said clamps continue to be engaged by said mechanism and slide circumferentially with respect to the drum; and (h) operating said mechanism so that said desired ones of said clamps become disengaged and grip a second edge of the plate.

16. The method of claim 15, wherein any of said clamps is operative to clamp an edge of the plate by means of pressure that is partly derived from centrifugal effect on a portion of the clamp during subsequent rotation of the drum.

* * * * *